C. B. DAWSON.
DUMPING CAR.
APPLICATION FILED SEPT. 28, 1910.

1,094,198.

Patented Apr. 21, 1914.
3 SHEETS—SHEET 1.

Witnesses
Floyd R. Cornwall
Edna W. Thomas

Inventor
C. B. Dawson
By Greeley & McIntire
Attorney

C. B. DAWSON.
DUMPING CAR.
APPLICATION FILED SEPT. 28, 1910.

1,094,198.

Patented Apr. 21, 1914.

3 SHEETS—SHEET 2.

Witnesses
Floyd R. Cornwall
Edna W. Thomas

Inventor
C. B. Dawson.
By Greeley & McIntire
Attorney

C. B. DAWSON.
DUMPING CAR.
APPLICATION FILED SEPT. 28, 1910.

1,094,198. Patented Apr. 21, 1914.

3 SHEETS—SHEET 3.

WITNESSES
Fenton H Belt
J. N. Sherwood

INVENTOR
Charles B. Dawson
A. L. Hough
Attorney

UNITED STATES PATENT OFFICE.

CHARLES B. DAWSON, OF FULTON, NEW YORK, ASSIGNOR TO ENOCH HARLAN, RECEIVER.

DUMPING-CAR.

1,094,198.  Specification of Letters Patent.  Patented Apr. 21, 1914.

Application filed September 28, 1910. Serial No. 584,275.

*To all whom it may concern:*

Be it known that I, CHARLES B. DAWSON, a citizen of the United States, residing at Fulton, in the county of Oswego and State of New York, have invented certain new and useful Improvements in Dumping-Cars; and I do hereby declare the following to be a full, clear, and exact description of the invention, such as will enable others skilled in the art to which it appertains to make and use the same.

My invention relates to dumping cars of the class in which the car body is arranged to swing laterally, so as to dump the load on one side or the other, and has for its object to provide a construction by which the car body, when in dumping position, will swing off its center toward the side on which the load is to be dumped, thus throwing the load farther from the tracks than does a dumping car of ordinary construction, and which will relieve the tendency to push the car truck from the tracks while dumping, and will cause the car to ride more steadily.

With these and other objects hereinafter more fully explained, my invention consists in the construction and combination hereinafter set forth and claimed.

Figure 1:
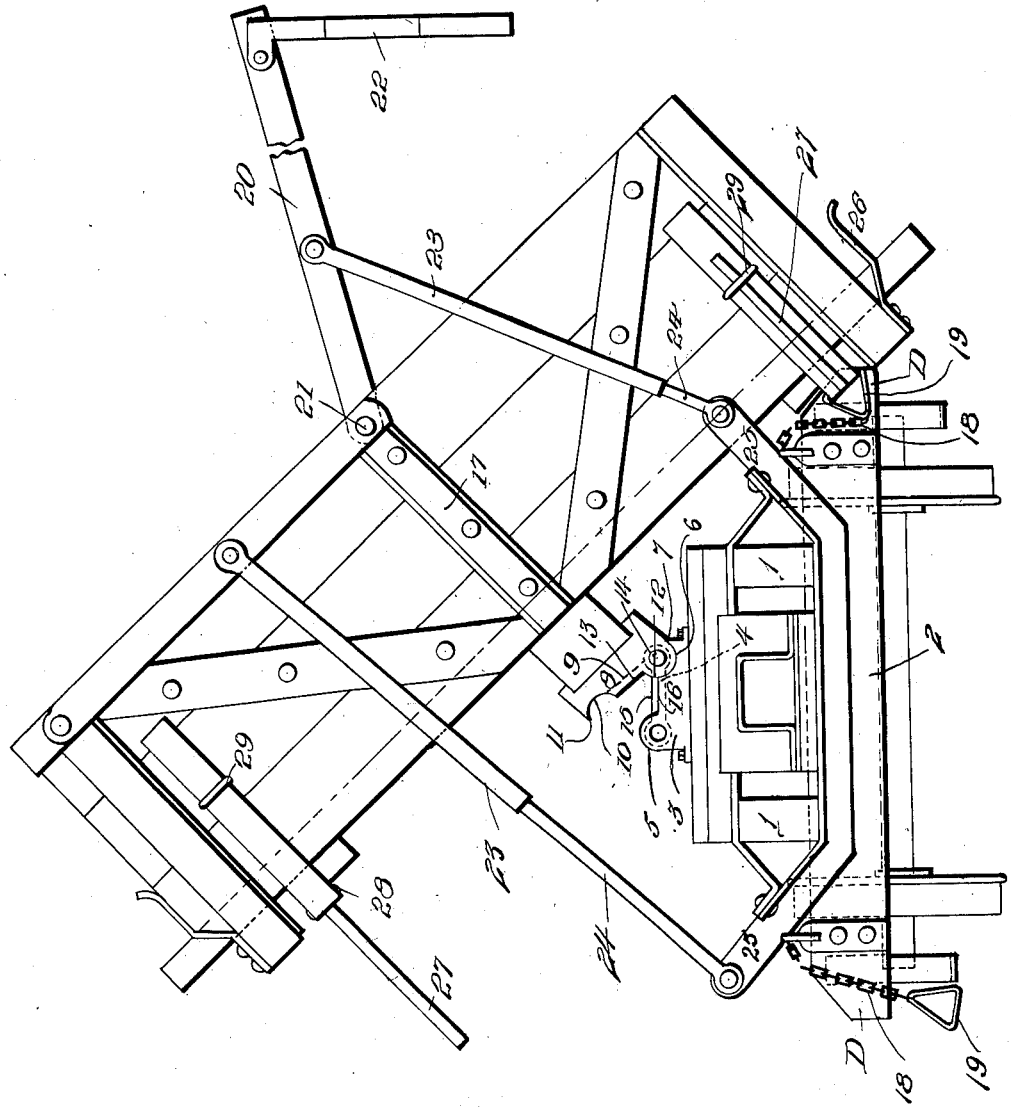
Figure 2:
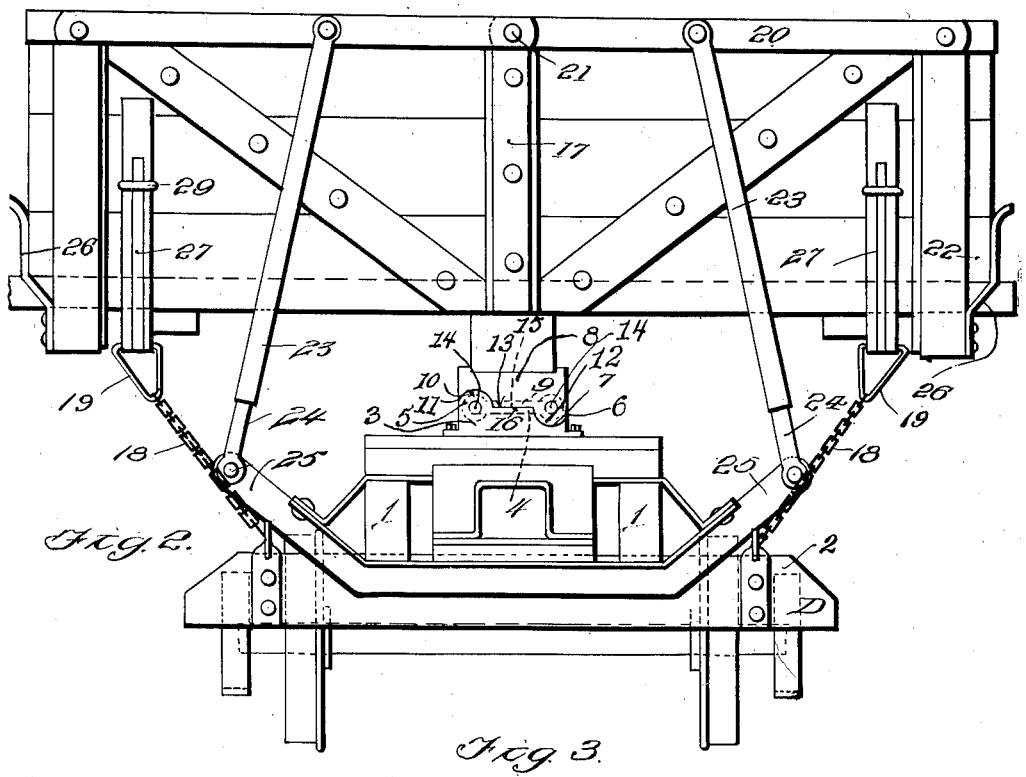
Figure 3:
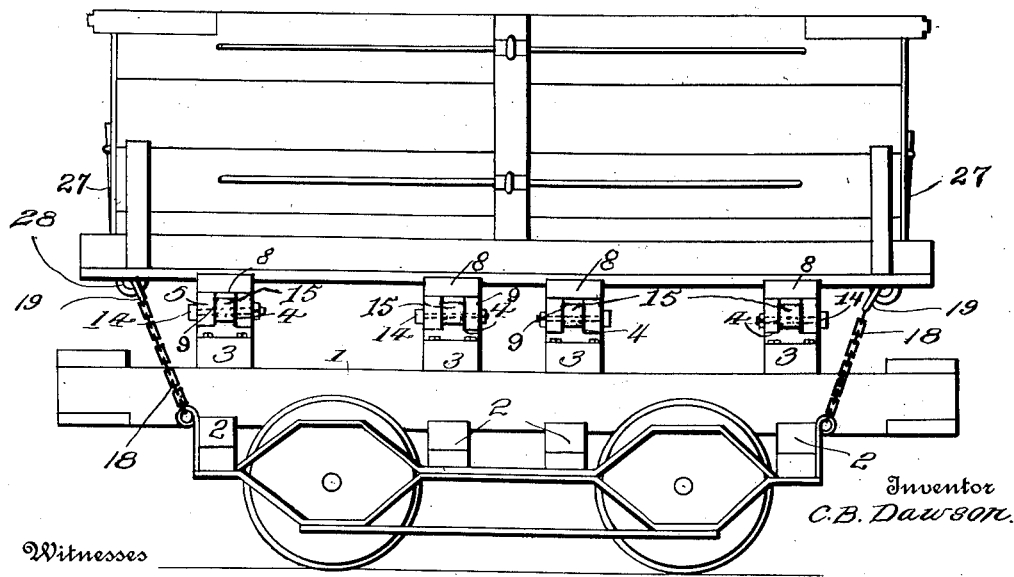
Figure 4:
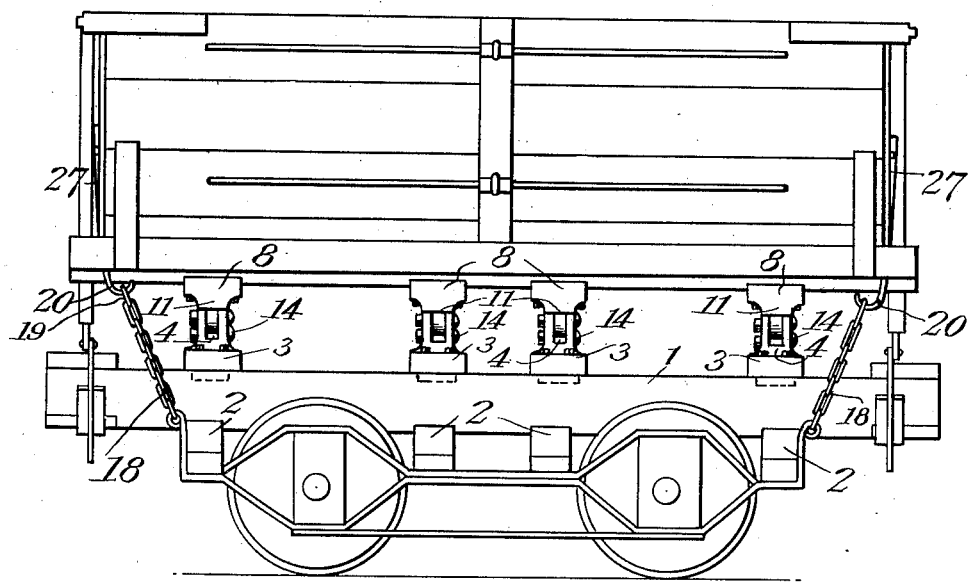
Figures 5, 6:
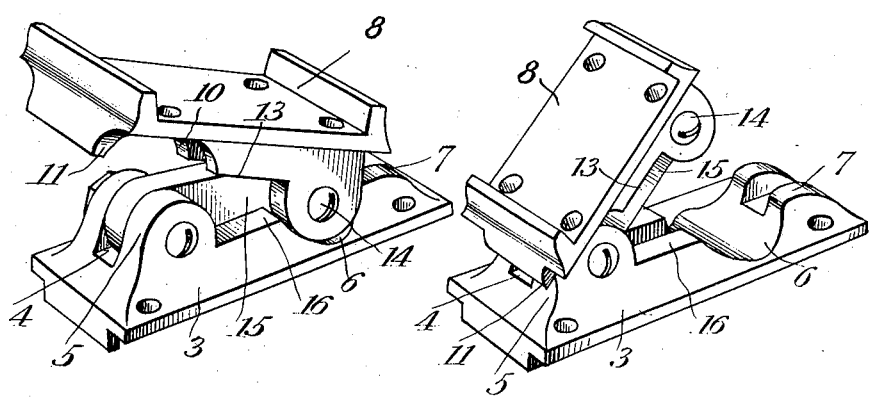

Referring to the drawings—Figure 1 is an end view of a car embodying my invention, the car being shown in dumping position; Fig. 2 is a similar view, showing the car body in position to receive its load, and Fig. 3 is a side view of the car. Fig. 4 is a side elevation of a dumping car, and Figs. 5 and 6 are detail perspective views of the double hinge.

In the drawings 1 is a sill extending longitudinally of the car truck midway between the wheels, supported by the cross sills 2, the ends of which in turn are supported by the car axles in any usual or convenient manner. At suitable intervals the longitudinal sill is provided with blocks 3, the upper ends of which are formed with a central recess 4, extending in a direction across the longitudinal line of the car, and with a semi-cylindrical boss 5 at one end and a semi-cylindrical recess 6, with its outer wall cut away, as shown at 7, at the other end, and a flat face 16 between the boss and the recess.

The car body is provided on its bottom with a block 8, having in its lower face a recess 9 corresponding to the recess 4 of the block 3, and having at one end a semi-cylindrical recess 10, having its outer wall cut away at 11, and at its other end having a semi-cylindrical boss 12, and with a flat face 13 between the recess and the boss; the two blocks 3 and 8 being adapted to fit together the recess 10 of the upper block fitting over the boss 5 of the lower block and the boss 12 of the upper block, fitting into the recess 6 of the lower block. The bosses 5 and 12 each have a hole at their centers to receive a pin 14, the pins 14 being connected by a link 15, which is received in the recesses 4 and 9.

When the car body is in position to receive its load, or the car is moving or resting on the track, the upper block 8 rests throughout its extent on the block 3, the recess 10 resting on the boss 5, the flat face 13 resting on the flat face 16, and the boss 12 resting on the recess 6, so that a broad support is afforded without tendency to rock. When the load is to be dumped, the opposite side of the car body to that on which the load is to be deposited is raised, and the body turns on one end or the other of the double hinge formed by the blocks 3 and 8, the pins 14 preventing possible disarrangement. As the center on which the car body turns in dumping is away from the longitudinal central line of the car, the side of car body on the side on which the load is to be deposited will be thrown outward farther than it would if the turning center were in the central longitudinal plane of the car. In dumping the weight of the car body and load will be sustained by the boss and recess, thus relieving the pins 14 of strain.

The car is provided with safety chains 18, connected at their lower ends with the car truck, and having at their upper ends loops 19 for engagement with a latch 27 on the car body, but while in the ordinary dumping car these chains must be depended on to hold the car body upright, in my construction they serve as means for insuring the car body from accidental tipping, the broad surface of the blocks 3 and 8 being sufficient under ordinary circumstances to maintain the body against tipping.

While the construction above described is adapted for use with a truck and car body of any desired construction, I prefer to use it in connection with the car body shown, in which the side gates on the side on which the load is to be dumped are automatically raised as the car body is inclined, to effect the dumping. The device by which this is effected consists of arms 20, pivoted at 21 midway between the sides of the car near its upper edge, having the side gates 22 pivotally connected to their outer ends. To the arms 20, between their ends, are pivotally connected links 23, arranged to telescope with links 24, pivoted at their lower ends to arms 25, which extend outward and upward from the car truck, the arrangement being such that as the car is tipped in dumping, the links 23 and 24 on the side on which the load is to be dumped will hold the arms 20 up, so that the side gates 22 will be withdrawn, while on the other side of the car the link 24 will be drawn out of link 23, thus permitting that side of the car body to rise. When the side gates of the car are in closed position they are retained against outward swing by arms 26. By reason of the pivoting of the side gates 22 to the arms 21, they will readily return to normal position after dumping.

The latch 27 is pivoted at 28 to the end of the car, and is held in locking position by a loop 29. To lock the safety chain 18, its loop 19 is slipped over the latch and the latch then swung upward on its pivot until its end is against the end of the car, in which position it is held by loop 29. By this arrangement the upward movement of the latch tightens the chain.

Having thus described my invention, what I claim is:

1. In a dumping car, a double hinge connection between the car body and truck comprising an upper and a lower block, each having at one end a semi-cylindrical boss and at the other end a recess adapted to receive the boss on the other block, a pin extending through the center of each boss, and a link connecting the pins of the two bosses.

2. A dumping car having a truck and a body, a stationary plate upon the truck, a tilting plate upon which the body rests, the adjacent faces of said plates each having a transverse recess, a projection upon each plate adapted to fulcrum in the recess of the other plate, the inner face of each plate having a longitudinal recess, and a link pivotally connecting said plates and adapted to seat in said longitudinal recesses when the plates are in horizontal relation, as set forth.

3. A dumping car having a truck and a body, a stationary plate and a pivotal plate, the adjacent faces of the plates having each a concaved transversely disposed recess near one end and projections which are spaced apart, the ends of the latter being convexed, the projections upon one plate adapted to engage the concaved recess in the other plate when the plates are in horizontal relation, the inner face of each plate intermediate the concaved projection and the recess being parallel with the outer face of the plate, the inner face of each plate having a central longitudinal slot intermediate said projections and intersecting the recess, pins passing through registering apertures in the projections upon each plate, and a link mounted pivotally at its ends upon said pins and adapted to engage the recesses upon the two plates when the latter are in their normal positions, as set forth.

In testimony whereof I affix my signature in presence of two witnesses.

CHARLES B. DAWSON.

Witnesses:
  VICTOR A. PYLES,
  JAMES C. ADAMS.